United States Patent
Siberski et al.

(10) Patent No.: US 9,751,567 B2
(45) Date of Patent: Sep. 5, 2017

(54) RAIL ASSEMBLY FOR CONTROLLED LATERAL DEFORMATION

(71) Applicant: GM GLOBAL TECHNOLOGY OPERATIONS LLC, Detroit, MI (US)

(72) Inventors: Thomas M. Siberski, White Lake, MI (US); Andrew W. White, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 17 days.

(21) Appl. No.: 14/960,617

(22) Filed: Dec. 7, 2015

(65) Prior Publication Data

US 2017/0158243 A1    Jun. 8, 2017

(51) Int. Cl.
*B62D 21/15*    (2006.01)
*B62D 25/02*    (2006.01)

(52) U.S. Cl.
CPC ......... *B62D 21/157* (2013.01); *B62D 25/025* (2013.01)

(58) Field of Classification Search
CPC ...... B62D 25/02; B62D 25/025; B62D 21/15; B62D 21/157
USPC ..... 296/29, 30, 187.12, 204, 187.08, 193.07
See application file for complete search history.

(56) References Cited

U.S. PATENT DOCUMENTS

| | | | | | |
|---|---|---|---|---|---|
| 5,370,438 | A | * | 12/1994 | Mori | B62D 25/02 296/203.02 |
| 5,641,194 | A | * | 6/1997 | Honma | B62D 21/157 296/187.12 |
| 6,053,564 | A | * | 4/2000 | Kamata | B62D 21/152 296/187.09 |
| 6,378,933 | B1 | * | 4/2002 | Schoen | B62D 29/002 296/187.02 |
| 6,428,085 | B1 | * | 8/2002 | Miyasaka | B60N 2/0715 296/187.12 |
| 6,854,795 | B2 | * | 2/2005 | Yamazaki | B62D 21/157 296/187.12 |
| 8,366,185 | B2 | * | 2/2013 | Herntier | B62D 25/025 296/187.12 |
| 8,511,746 | B2 | * | 8/2013 | Kawamura | B62D 25/00 296/187.12 |
| 8,641,131 | B2 | * | 2/2014 | Honda | B62D 25/025 296/187.12 |
| 9,493,190 | B1 | * | 11/2016 | Alwan | B62D 21/157 |
| 2004/0195865 | A1 | * | 10/2004 | Tomita | B62D 21/09 296/203.04 |

(Continued)

*Primary Examiner* — Gregory Blankenship
(74) *Attorney, Agent, or Firm* — Quinn IP Law

(57) ABSTRACT

A rail assembly configured to limit a lateral deformation of an intermediate portion of the rail assembly to a predetermined lateral deformation when the rail assembly is subjected to an external force includes an inner portion, an outer portion, and a web portion. The inner portion has an inner wall. The outer portion has an outer wall and is attached to the inner portion. The inner portion and the outer portion together form a hollow rail. The web portion is configured with a deformation initiator, disposed inside of the hollow rail, and attached to the inner wall of the inner portion and the outer wall of the outer portion. The web portion is configured to limit the lateral deformation of the intermediate portion of the rail assembly to the predetermined lateral deformation when the rail assembly is subjected to the external force.

18 Claims, 2 Drawing Sheets

(56) References Cited

U.S. PATENT DOCUMENTS

| | | | | |
|---|---|---|---|---|
| 2006/0097533 A1* | 5/2006 | Watanabe | .......... | B62D 25/2036 296/30 |
| 2009/0146457 A1* | 6/2009 | Kanagai | ................ | B62D 21/157 296/187.12 |
| 2009/0250969 A1* | 10/2009 | Wani | ..................... | B62D 21/157 296/187.03 |
| 2010/0194146 A1* | 8/2010 | Nishimura | ........... | B62D 21/157 296/193.06 |
| 2010/0207426 A1* | 8/2010 | Tsuruta | ................ | B62D 21/157 296/187.12 |
| 2012/0068499 A1* | 3/2012 | Mildner | ............. | B62D 25/2045 296/193.07 |
| 2013/0049392 A1* | 2/2013 | Kurogi | ................... | B62D 25/02 296/30 |
| 2013/0049408 A1* | 2/2013 | Kurogi | ................... | B62D 25/02 296/209 |
| 2014/0306490 A1* | 10/2014 | Nydam | ................ | B62D 25/025 296/203.03 |
| 2014/0333093 A1* | 11/2014 | Matsuura | .............. | B62D 25/02 296/187.12 |
| 2015/0042125 A1* | 2/2015 | Bruggemann | ....... | B62D 25/025 296/187.12 |
| 2015/0175213 A1* | 6/2015 | Chai | ...................... | B62D 25/08 296/187.09 |
| 2016/0194034 A1* | 7/2016 | Emura | ................. | B62D 25/025 296/209 |
| 2016/0244101 A1* | 8/2016 | Blum | ................... | B62D 25/025 |

\* cited by examiner

RAIL ASSEMBLY FOR CONTROLLED LATERAL DEFORMATION

TECHNICAL FIELD

This disclosure relates to a rail assembly for controlled lateral deformation.

BACKGROUND

A machine or a manufacture, such as a vehicle, may be subject to an external force event and may include a structure having a rail assembly.

SUMMARY

A rail assembly and a vehicle are disclosed herein. The rail assembly is configured to limit a lateral deformation of an intermediate portion of the rail assembly to a predetermined lateral deformation when the rail assembly is subjected to an external force. The rail assembly includes an inner portion, an outer portion, and a web portion. The inner portion has an inner wall. The outer portion has an outer wall and is attached to the inner portion. The inner portion and the outer portion together form a hollow rail. The web portion is configured with a deformation initiator, disposed inside of the hollow rail, and attached to the inner wall of the inner portion and the outer wall of the outer portion. The web portion is configured to limit the lateral deformation of the intermediate portion of the rail assembly to the predetermined lateral deformation when the rail assembly is subjected to the external force.

The vehicle is subjectable to an external force. The vehicle includes a body structure having a rail assembly. The rail assembly includes a rail inner portion, a rail outer portion, and a horizontal web portion. The rail inner portion has a substantially vertical inner wall. The rail outer portion has a substantially vertical outer wall and is attached to the rail inner portion. The rail inner portion and the rail outer portion together form a hollow rail. The horizontal web portion is configured with a deformation initiator, disposed inside of the hollow rail, and attached to the inner wall of the rail inner portion and the outer wall of the rail outer portion. The horizontal web portion is configured to limit a lateral deformation of an intermediate portion of the rail assembly to a predetermined lateral deformation when the vehicle is subjected to the external force.

The rail assembly and the vehicle disclosed herein limit the lateral deformation of the intermediate portion of the rail assembly to the predetermined lateral deformation when the rail assembly or the vehicle is subjected to the external force. This disclosure applies to any machine or manufacture having a structure including a similar rail assembly and subject to an external force. This disclosure applies to any vehicle, including but not limited to cars, trucks, vans, busses, boats, trains, manufacturing vehicles and equipment, construction vehicles and equipment, maintenance vehicles and equipment, and military vehicles and equipment.

The above features and advantages and other features and advantages of the present teachings are readily apparent from the following detailed description of the best modes for carrying out the present teachings when taken in connection with the accompanying drawings.

DETAILED DESCRIPTION

Figure 1:
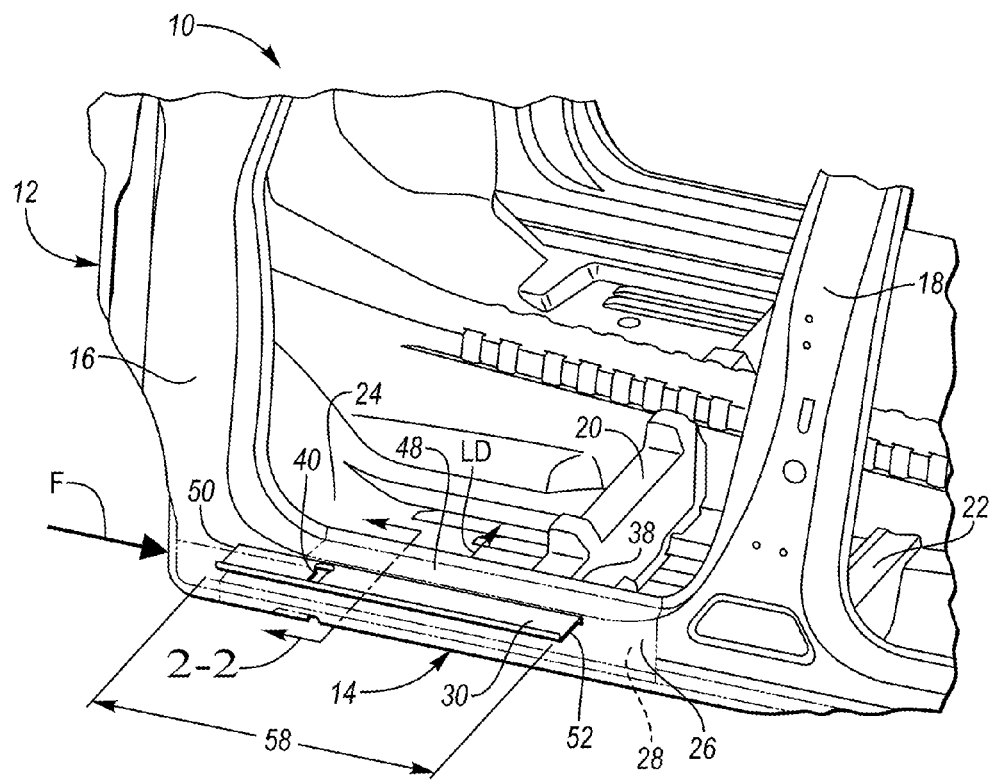
FIG. 1 is a fragmentary, schematic, perspective illustration of a vehicle having a body structure including a rail assembly configured to limit a lateral deformation of an intermediate portion of the rail assembly when the vehicle is subjected to an external force. An outer portion of the rail assembly is shown in phantom so that a web portion of the rail assembly can be seen.

Referring to the drawings, wherein like reference numbers refer to like components throughout the views, FIG. 1 shows a vehicle 10 that may be subject to an external force (arrow F) event. The vehicle 10 includes a body structure 12 having a rocker rail assembly or rail assembly 14. The body structure 12 may be made of one or more of a steel alloy material, an aluminum alloy material, and any other metal and nonmetal structural material. The rail assembly 14 may be located and oriented in the body structure 12, as shown. Alternatively, the rail assembly 14 may be located in another portion of the body structure 12 and may be oriented in another direction, as appropriate.

The body structure 12 may include a front body hinge pillar 16, a B pillar 18, a number two bar 20, a number three bar 22, and a floor panel 24, as shown. The rail assembly 14 may be connected to the front body hinge pillar 16, the B pillar 18, the number two bar 20, the number three bar 22, and the floor panel 24, as shown. The number two bar 20 is a cross car structural member that supports a front mount (not shown) of a front seat (not shown) of the vehicle 10. The number three bar 22 is a cross car structural member that supports a rear mount (not shown) of the front seat. The number three bar 22 is disposed rearward of the number two bar 20 in the vehicle 10. The rail assembly 14 may be connected to other components of the body structure 12 of the vehicle 10 as appropriate.

Figure 2:
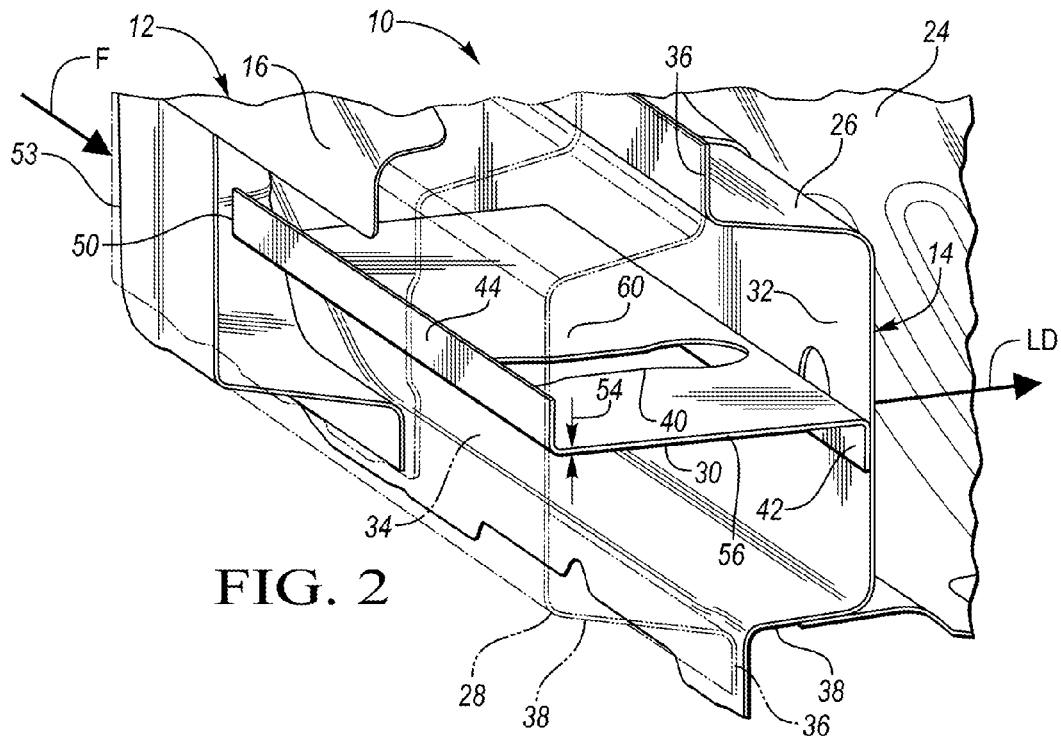
FIG. 2 is a schematic, cross-sectional illustration, partially in elevation, of the rail assembly of FIG. 1, taken at line 2-2 of FIG. 1, with the outer portion of the rail assembly shown in phantom.

Referring now to FIGS. 1-2, the rocker rail assembly or rail assembly 14 includes a rocker rail inner or inner portion 26, a rocker rail outer or outer portion 28, and a deformation controlling web portion 30. The inner portion 26 has an inner wall 32. The inner wall 32 may be disposed in a substantially vertical plane, substantially perpendicular to the ground plane, as shown. The ground plane is defined herein as the plane of the road or ground on which the vehicle travels or is stationary on. The outer portion 28 has an outer wall 34. The outer wall 34 may be disposed in a substantially vertical plane, substantially perpendicular to the ground plane, as shown. The inner wall 32 and the outer wall 34 may be disposed in other planes, as appropriate. The inner wall 32 and the outer wall 34 may be substantially parallel to one another. The outer portion 28 is connected to the inner portion 26 at one or more attachments 36 such that and the outer portion 28 and the inner portion 26 together form a hollow rail 38.

The deformation controlling web portion 30 may be disposed in a substantially horizontal plane, substantially parallel to the ground plane, as shown. The web portion 30 may be disposed in other planes, as appropriate. The web portion 30 may be substantially perpendicular to the inner wall 32 and the outer wall 34. The web portion 30 is configured with a deformation initiator 40, to be described in greater detail below. The web portion 30 is disposed inside of the hollow rail 38 and is attached to the inner wall 32 of the inner portion 26 and the outer wall 34 of the outer portion 28. The web portion 30 may include a first flange 42 and a second flange 44. The first flange 42 of the web portion 30 may be attached to the inner wall 32 of the inner portion 26 via a weld, an adhesive, or any other suitable attachment. The second flange 44 of the web portion 30 may be attached to the outer wall 34 of the outer portion 28 via a weld, an adhesive, or any other suitable attachment. The web portion 30 is configured to limit a lateral deformation (arrow LD) of an intermediate portion 48 of the rail assembly 14 to a predetermined lateral deformation (not shown) when the vehicle 10 is subjected to the external force (arrow F).

The web portion 30 has a rear or first end 52 and a front or second end 50. The hollow rail 38 has a front or first end 53. The second end 50 of the web portion 30 may be proximate to the front body hinge pillar 16 and to the external force (arrow F), as shown. The second end 50 of the web portion 30 may be attached to the front body hinge pillar 16. The second end 50 of the web portion 30 may be proximate to the first end 53 of the hollow rail 38. The first end 52 of the web portion 30 may be proximate to the number two bar 20, as shown. Alternatively, the first end 52 of the web portion 30 and the second end 50 or the web portion 30 may be proximate to and/or connected to other components of the body structure 12.

The web portion 30 may extend along a portion of the length of the hollow rail 38, as shown. The intermediate portion 48 of the rail assembly 14 may be disposed between the deformation initiator 40 and the first end 52 of the web portion 30. The deformation initiator 40 may be disposed between the second end 50 of the web portion 30 and the intermediate portion 48 of the rail assembly 14. Alternatively, the intermediate portion 48 of the rail assembly 14 may be disposed between the deformation initiator 40 and the number two bar 20. In another alternative, the intermediate portion 48 of the rail assembly may be disposed between the deformation initiator 40 and another component of the body structure 12.

The web portion 30 has a thickness 54, is made of a material 56, and has a length 58. The thickness 54 of the web portion 30 may be selected to limit the lateral deformation (arrow LD) of the intermediate portion 48 of the rail assembly 14 to the predetermined lateral deformation when the rail assembly 14 is subjected to the external force (arrow F). The material 56 of the web portion 30 may be selected to limit the lateral deformation (arrow LD) of the intermediate portion 48 of the rail assembly 14 to the predetermined lateral deformation when the rail assembly 14 is subjected to the external force (arrow F). The length 58 of the web portion 30 may be selected to limit the lateral deformation (arrow LD) of the intermediate portion 48 of the rail assembly 14 to the predetermined lateral deformation when the rail assembly 14 is subjected to the external force (arrow F).

The deformation initiator 40 of the web portion 30 may be disposed between the front body hinge pillar 16 and the number two bar 20 of the body structure 12. Alternatively, the deformation initiator 40 may be disposed between other components of the body structure 12. The deformation initiator 40 may be an opening formed in the web portion 30, as shown. The deformation initiator 40 may be an opening formed in a central portion 60 of the web portion 30. The opening may extend from the central portion 60 of the web portion 30 to or into one or both of the first flange 42 and the second flange 44 of the web portion 30. The opening may extend from a central portion 60 of the web portion 30 through one of the first flange 42 and the second flange 44 of the web portion 30.

The deformation initiator 40 of the web portion 30 may be configured to limit the lateral deformation (arrow LD) of the intermediate portion 48 of the rail assembly 14 to the predetermined lateral deformation when the rail assembly 14 is subjected to the external force (arrow F). The deformation initiator 40 may be a slot, a round hole, an ellipse, a notch, and/or any other suitable opening formed in the web portion 30. The deformation initiator 40 may be any other suitable feature formed in the web portion 30. For example, the deformation initiator 40 may be a reduced thickness portion or a bent or deformed portion of the web portion 30.

Figure 3A:
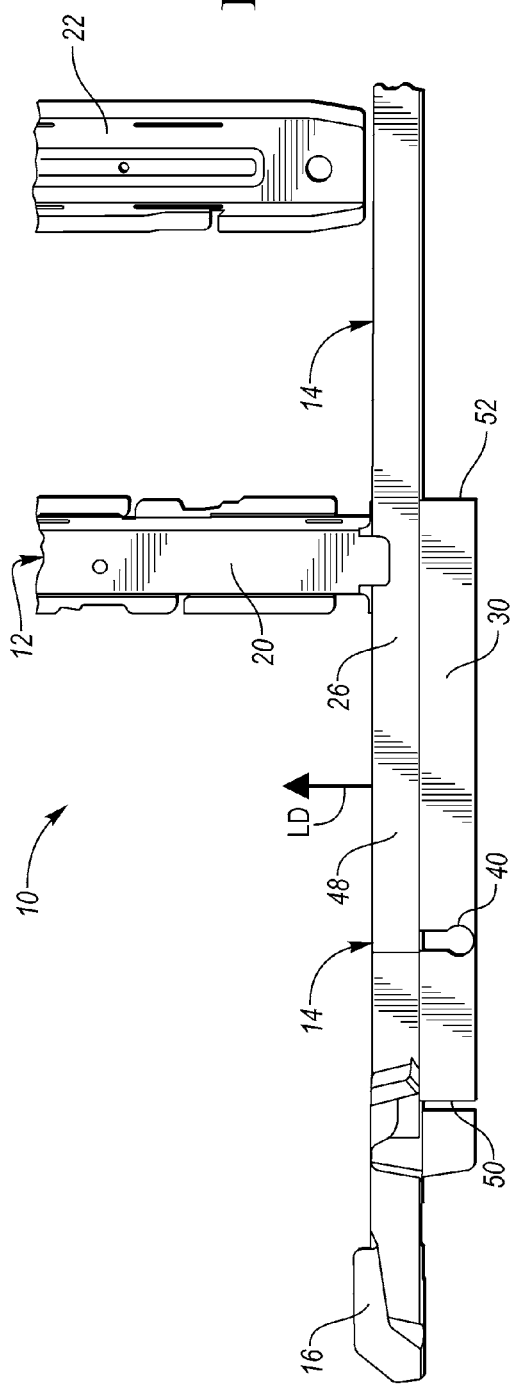
FIG. 3A is a fragmentary, schematic, top view illustration of the vehicle of FIG. 1, before the vehicle is subjected to the external force, with the outer portion of the rail assembly and other portions of the body structure removed for clarity.
Figure 3B:
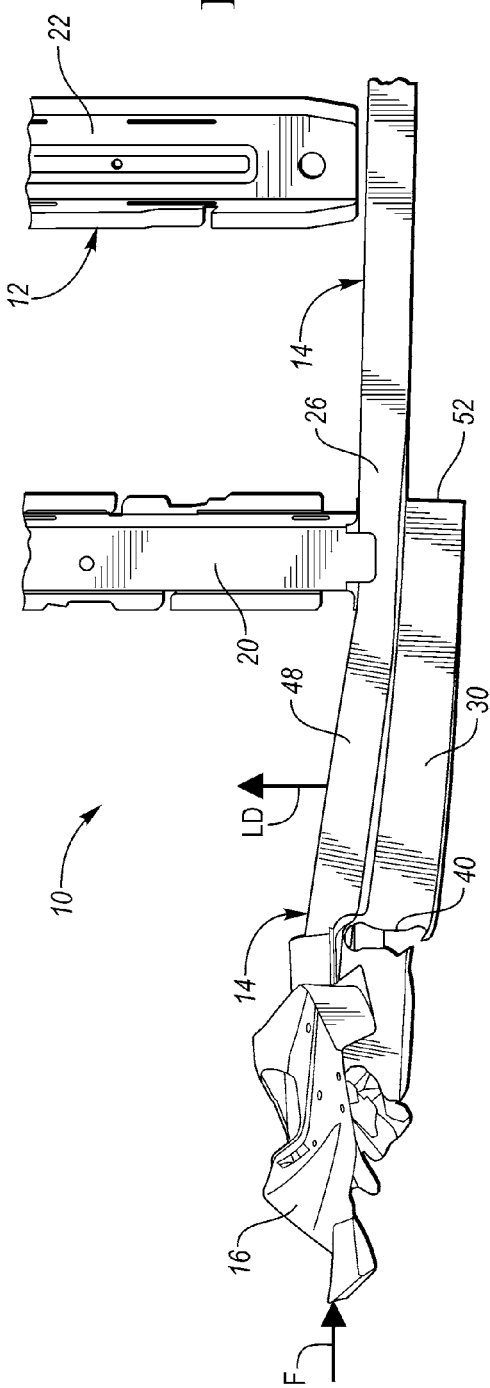
FIG. 3B is a fragmentary, schematic, top view illustration of the vehicle of FIG. 1, after the vehicle is subjected to the external force, with the outer portion of the rail assembly and other portions of the body structure removed for clarity.

Referring now to FIGS. 3A-3B, FIG. 3A shows the rail assembly 14 prior to application of the external force (arrow F), as shown in FIG. 3B. FIG. 3B shows the rail assembly 14 after application of the external force (arrow F). The web portion 30 affects how the rail assembly 14 is deformed by the external force (arrow F), thus limiting the lateral deformation (arrow LD) of the intermediate portion 48 of the rail assembly 14 to the predetermined lateral deformation. The effect of the web portion 30 on the rail assembly 14 deformation may be adjusted or tuned by variations in the configuration of the web portion 30.

Referring again to FIGS. 1-2, the web portion 30 may be configured to limit the lateral deformation (arrow LD) of the intermediate portion 48 of the rail assembly 14 to the predetermined lateral deformation when the rail assembly 14 is subjected to the external force (arrow F) by varying the location and the configuration of the deformation initiator 40, the thickness 54 of the web portion 30, the material 56 of the web portion 30, the length 58 of the web portion 30, the location of the web portion 30 within the hollow rail 38, and/or the attachment of the web portion 30 to the hollow rail 38.

In an alternative embodiment, the rail assembly 14 may include a plurality of web portions 30 each configured with a deformation initiator 40, disposed inside of the hollow rail 38, and attached to the inner wall 32 of the inner portion 26 and the outer wall 34 of the outer portion 28. In another alternative embodiment, the web portion 30 may be configured with a plurality of deformation initiators 40.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A rail assembly configured to limit a lateral deformation of an intermediate portion of the rail assembly to a predetermined lateral deformation when the rail assembly is subjected to an external force, comprising:
    an inner portion having an inner wall;
    an outer portion having an outer wall and attached to the inner portion, wherein the inner portion and the outer portion together form a hollow rail; and
    a web portion having a central portion, a first flange, and a second flange and configured with a deformation initiator, the web portion disposed inside of the hollow rail, and attached to the inner wall of the inner portion and the outer wall of the outer portion;

wherein the deformation initiator is configured to limit the lateral deformation of the intermediate portion of the rail assembly to the predetermined lateral deformation when the rail assembly is subjected to the external force; and wherein the deformation initiator extends from the central portion of the web portion to at least one of the first and second flanges of the web portion.

2. The rail assembly of claim 1, wherein the web portion has a first end;

wherein the intermediate portion of the rail assembly is disposed between the deformation initiator and the first end of the web portion.

3. The rail assembly of claim 1, wherein the web portion has a thickness; and wherein the web portion is configured to limit the lateral deformation of the intermediate portion of the rail assembly to the predetermined lateral deformation when the rail assembly is subjected to the external force by the thickness of the web portion.

4. The rail assembly of claim 1, wherein the web portion is made of a material; and wherein the web portion is configured to limit the lateral deformation of the intermediate portion of the rail assembly to the predetermined lateral deformation when the rail assembly is subjected to the external force by the material of the web portion.

5. The rail assembly of claim 1, wherein the web portion has a length; and wherein the web portion is configured to limit the lateral deformation of the intermediate portion of the rail assembly to the predetermined lateral deformation when the rail assembly is subjected to the external force by the length of the web portion.

6. The rail assembly of claim 1, wherein the rail assembly includes a plurality of web portions each configured with a deformation initiator, disposed inside of the hollow rail, and attached to the inner wall of the inner portion and the outer wall of the outer portion.

7. The rail assembly of claim 1, wherein the deformation initiator is an opening formed in the web portion.

8. The rail assembly of claim 7, wherein the opening is a slot.

9. The rail assembly of claim 1, wherein the web portion is configured with a plurality of deformation initiators.

10. A vehicle subjectable to an external force, comprising:
a body structure having a rail assembly, including:
a rail inner portion having a substantially vertical inner wall;
a rail outer portion having a substantially vertical outer wall and attached to the rail inner portion, wherein the rail inner portion and the rail outer portion together form a hollow rail; and
a horizontal web portion having a central portion, a first flange, and a second flange and configured with a deformation initiator, the horizontal web portion being disposed inside of the hollow rail, and attached to the inner wall of the rail inner portion and the outer wall of the rail outer portion;
wherein the deformation initiator is configured to limit a lateral deformation of an intermediate portion of the rail assembly to a predetermined lateral deformation when the vehicle is subjected to the external force; and
wherein the deformation initiator extends from the central portion of the horizontal web portion to at least one of the first and second flanges of the horizontal web portion.

11. The vehicle of claim 10, wherein the horizontal web portion has a first end; and wherein the intermediate portion of the rail assembly is disposed between the deformation initiator and the first end of the horizontal web portion.

12. The vehicle of claim 10, wherein the horizontal web portion has a thickness and a length and is made of a material; and wherein the horizontal web portion is configured to limit the lateral deformation of the intermediate portion of the rail assembly to the predetermined lateral deformation when the rail assembly is subjected to the external force by at least one of the thickness of the horizontal web portion, the length of the horizontal web portion, and the material of the horizontal web portion.

13. The vehicle of claim 10, wherein the deformation initiator is an opening formed in the horizontal web portion.

14. A vehicle subjectable to an external force, comprising:
a body structure, including:
a front body hinge pillar;
a number two bar;
a floor panel; and
a rocker rail assembly attached to the front body hinge pillar, the number two bar, and the floor panel, the rocker rail assembly including:
a rocker rail inner having a substantially vertical inner wall;
a rocker rail outer having a substantially vertical outer wall and attached to the rocker rail inner, wherein the rocker rail inner and the rocker rail outer together form a hollow rail having a front end; and
a horizontal web having a front end and configured with a deformation initiator, disposed inside of the hollow rail, and attached to the inner wall of the rocker rail inner and the outer wall of the rocker rail outer;
wherein the horizontal web is configured to limit a lateral deformation of an intermediate portion of the rocker rail assembly to a predetermined lateral deformation when the vehicle is subjected to the external force; and
wherein the front end of the horizontal web is located proximate to the front end of the hollow rail; and
wherein the rear end of the horizontal web is located proximate to the number two bar.

15. The vehicle of claim 14, wherein the deformation initiator is disposed between the front body hinge pillar and the number two bar; and wherein the intermediate portion of the rocker rail assembly is disposed between the deformation initiator and the number two bar.

16. The vehicle of claim 15, wherein the horizontal web has a thickness and a length and is made of a material; and wherein at least one of the thickness of the horizontal web, the length of the horizontal web, and the material of the horizontal web is configured to limit the lateral deformation of the intermediate portion of the rocker rail assembly to the predetermined lateral deformation when the vehicle is subjected to the external force.

17. The vehicle of claim 15, wherein the deformation initiator is an opening formed in the horizontal web; and wherein the opening is configured to limit the lateral deformation of the intermediate portion of the rocker rail assembly to the predetermined lateral deformation when the vehicle is subjected to the external force.

18. The vehicle of claim 15, wherein the horizontal web is configured with a plurality of deformation initiators.

* * * * *